(12) United States Patent
Chao

(10) Patent No.: US 8,254,682 B2
(45) Date of Patent: Aug. 28, 2012

(54) PATTERN DETECTING METHOD AND RELATED IMAGE PROCESSING APPARATUS

(75) Inventor: Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1329 days.

(21) Appl. No.: 11/733,777

(22) Filed: Apr. 11, 2007

(65) Prior Publication Data

US 2007/0248287 A1 Oct. 25, 2007

(30) Foreign Application Priority Data

Apr. 20, 2006 (TW) ................. 95114098 A

(51) Int. Cl.
*G06K 9/00* (2006.01)
(52) U.S. Cl. ...................................... 382/181
(58) Field of Classification Search .................... 382/181
See application file for complete search history.

(56) References Cited

U.S. PATENT DOCUMENTS

| | | | |
|---|---|---|---|
| 5,029,108 A | 7/1991 | Lung | |
| 5,485,534 A | 1/1996 | Takemoto | |
| 5,539,469 A | 7/1996 | Jung | |
| 6,133,957 A | 10/2000 | Campbell | |
| 6,421,090 B1 | 7/2002 | Jiang et al. | |
| 6,466,693 B1 | 10/2002 | Otsu | |
| 6,654,497 B1 | 11/2003 | Kondo | |
| 6,810,156 B1 * | 10/2004 | Itoh | 382/300 |
| 6,879,733 B2 | 4/2005 | Shu et al. | |
| 7,355,755 B2 | 4/2008 | Suino | |
| 2002/0006223 A1 * | 1/2002 | Yamagata et al. | 382/199 |
| 2004/0037465 A1 | 2/2004 | Krause | |
| 2004/0086168 A1 | 5/2004 | Kuwabara | |
| 2004/0170318 A1 | 9/2004 | Crandall | |
| 2004/0208384 A1 * | 10/2004 | Lin et al. | 382/254 |
| 2005/0237428 A1 | 10/2005 | Chang | |
| 2006/0109377 A1 | 5/2006 | Chao | |

FOREIGN PATENT DOCUMENTS

| | | |
|---|---|---|
| TW | I234388 | 6/2005 |
| TW | I248759 | 2/2006 |
| TW | I252039 | 3/2006 |
| WO | 2005/001593 A2 | 1/2005 |

* cited by examiner

*Primary Examiner* — Hadi Akhavannik
(74) *Attorney, Agent, or Firm* — Winston Hsu; Scott Margo

(57) ABSTRACT

The present invention discloses an image processing apparatus for processing an image. The image processing apparatus includes a line-pattern detecting module and an image processing module. The line-pattern detecting module examines how a first plurality of pixels of a first pixel line change and how a second plurality of pixels of a second pixel line change so as to determine which pattern an area of the image corresponds to. The image processing module selectively performs at least one of a plurality of image processing operations according to the pattern the image area corresponds to. The first and the second pixel lines correspond to the image area.

16 Claims, 11 Drawing Sheets

PATTERN DETECTING METHOD AND RELATED IMAGE PROCESSING APPARATUS

BACKGROUND OF THE INVENTION

1. Field of the Invention

The present invention relates to pattern detection in images, and more particularly, to a method for examining how pixels of at least a pixel line in an image change so as to determine which pattern an area of the image corresponds to.

2. Description of the Prior Art

Pixel interpolation is a widely used image processing technique. For example, pixel interpolation is usually employed for generating required pixel values in de-interlacing or image-scaling operations. Generally, the performance of the pixel interpolation operation greatly affects the interpolated image quality.

Conventional techniques select the interpolation method (for example, intra-field or inter-field) according to results of an edge detection operation or a motion detection operation. Proper interpolation methods, however, should not be selected according to results of an edge detection operation or motion detection operation only, otherwise interpolation defects might be generated resulting in worse image quality or unstable phenomenon of dynamic image display.

SUMMARY OF THE INVENTION

It is therefore one of the objectives of the present invention to provide a pattern detecting method for examining a pattern corresponding to an image area and a related image processing apparatus.

According to an embodiment of the present invention, a method for determining which pattern an area in an image corresponds to is disclosed. The pattern detecting method includes: examining how a first plurality of pixels of a first pixel line in the image change; examining how a second plurality of pixels of a second pixel line in the image change; and determining which pattern the image area corresponds to according to how the first plurality of pixels change and how the second plurality of pixels change, wherein the first pixel line and the second pixel line correspond to the image area.

According to an embodiment of the present invention, an image processing apparatus for processing an image is disclosed. The image processing apparatus includes: a line-pattern detecting module, for examining how a first plurality of pixels of a first pixel line change and how a second plurality of pixels of a second pixel line change so as to determine which pattern an area of the image corresponds to, wherein the first pixel line and the second pixel line correspond to the image area; and an image processing module, coupled to the line-pattern detecting module, for selectively performing at least one of a plurality of image processing operations according to the pattern the image area corresponds to.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
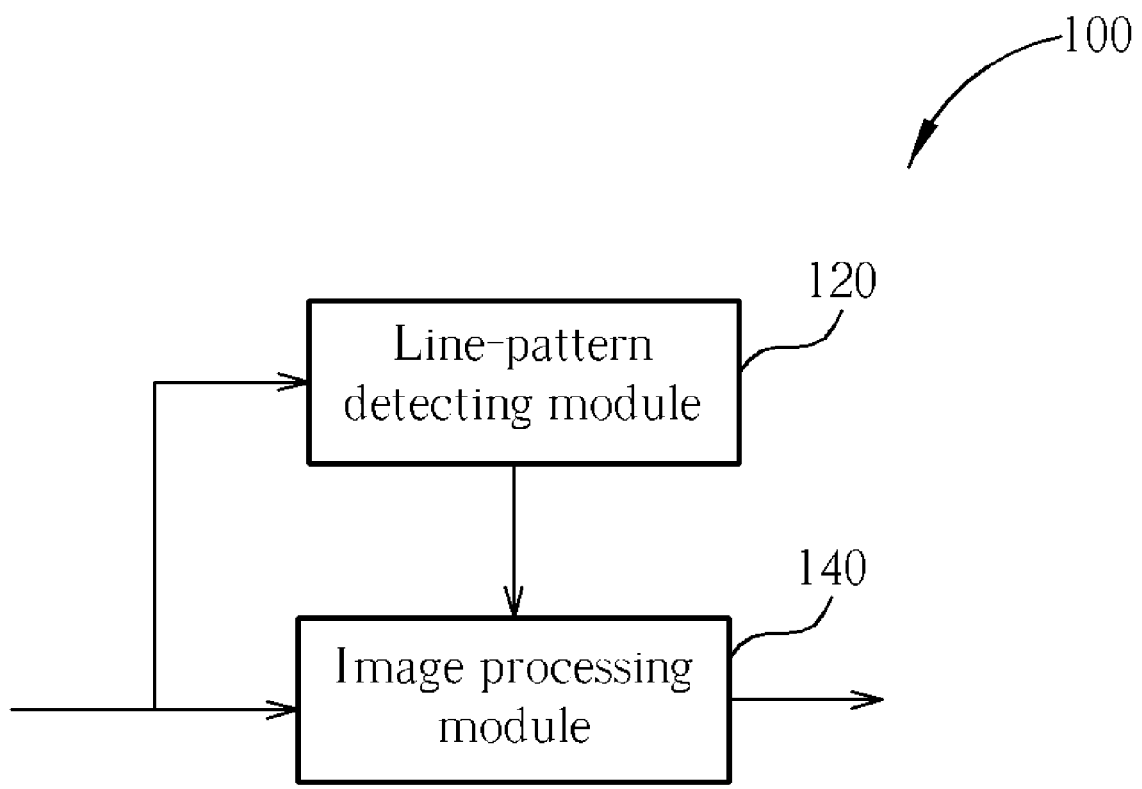
FIG. 1 shows an image processing apparatus according to an exemplary embodiment of the present invention.

The disclosed image processing apparatus and related method of the present invention can be applied in various related image processing fields such as image processing operations, MPEG encoding and decoding operations, video decoding operations, or digital TVs, etc. FIG. 1 shows an image processing apparatus 100 according to an embodiment of the present invention. In this embodiment, the image processing apparatus 100 includes a line-pattern detecting module 120 and an image processing module 140, wherein the line-pattern detecting module 120 is utilized to examine how a first plurality of pixels of a first pixel line change and how a second plurality of pixels of a second pixel line change so as to determine which pattern an area of the image corresponds to, and the image processing module 140 is utilized to selectively perform at least one of a plurality of image processing operations according to the pattern the image area corresponds to, which is examined by the line-pattern detecting module 120.

For example, if the image processing apparatus 100 is required to be applied in a de-interlacing operation, then the image can be a frame in a video data, and a field (the field includes half scan lines of the frame) corresponding to the frame is an input signal received by the line-pattern detecting module 120 and the image processing module 140. The image area can be a required interpolated pixel on the $Y_{th}$ scan line (not included in the field) in the frame, and the first and the second pixel lines can be the $(Y-K)_{th}$ and the $(Y+J)_{th}$ scan lines in the frame respectively; the first and the second pixel lines are included in the field and under a preferred condition, K=1 and J=1. The image processing module 140 can be an interpolation operation module for selectively performing the intra-field or inter-field interpolation operation according to the pattern the required interpolated pixel corresponds to, which is examined by the line-pattern detecting module 120, to get the required interpolated pixel. The image processing module 140 can also select an interpolation searching range (or interpolation searching angle) according to the pattern the required interpolated pixel corresponds to, which is examined by the line-pattern detecting module 120, so as to perform the interpolation operation and get the required interpolated pixel. For example, when the line-pattern detecting module 120 examines that the required interpolated pixel corresponds to a right tilted edge pattern, then the image processing module 140 does not need to search the interpolation range of the left tilted angle when executing the interpolation operation.

In addition, if the image processing apparatus 100 of the embodiment needs to be applied in the image scaling operation, then the image can be a target image. The existing pixel data in the target image forms an input signal received by the line-pattern detecting module 120 and the image processing module 140. The image area can be a required interpolated pixel on the $Y_{th}$ pixel line (required interpolated pixel line) in the target image, and the first and the second pixel lines can be the $(Y-K)_{th}$ and the $(Y+J)_{th}$ pixel lines (existing pixel lines) in the target image respectively. The image processing module 140 can be an interpolation operation module for selecting the interpolation searching range (or searching angle) according to the pattern the required interpolated pixel corresponds to, which is examined by the line-pattern detecting module 120, so as to perform the interpolation operation and get the required interpolated pixel. Of course, these two applications mentioned above are only for illustration purposes, and any person who is familiar with image processing techniques should be able to apply the disclosed concept of the present invention to related fields of image (video) processing.

The line-pattern detecting module 120 is utilized to perform a pixel operation in sequence for the first plurality of pixels to examine how the first plurality of pixels change, and perform the pixel operation in sequence for the second plurality of pixels to examine how the second plurality of pixels change along directions of the first and the second pixel lines (these can be in a horizontal direction of the image) respectively, so as to determine which pattern the image area corresponds to. The so-called "pixel operation in sequence" can be achieved by various schemes. For example, assuming that the target pixel is $P(X, Y)$, and the first plurality of pixels are $P(X-5,Y-1), P(X-4,Y-1), \ldots, P(X+4,Y-1), P(X+5,Y-1)$ in sequence, and the second plurality of pixels are $P(X-5, Y+1), P(X-4,Y+1), \ldots, P(X+4,Y+1), P(X+5,Y+1)$, then the line-pattern detecting module 120 can calculate values of $[P(X+J, Y-1)-P(X+J-1, Y-1)]$ when $J=-4\sim+5$ in sequence for the first pixel line. Then, the difference value is compared with at least a predetermined threshold value. If the generated difference value is larger than a first predetermined threshold value (such as +10), then a flag is recorded corresponding to "positive (variation)"; if the generated difference value is smaller than a second predetermined threshold value (such as −10), then a flag is recorded corresponding to "negative (variation)"; if the generated difference value is between the first predetermined threshold value and the second predetermined threshold value, then a flag is recorded corresponding to "none (variation)". Since operation for the second plurality of pixels can be the same as the operation mentioned above, the details are therefore omitted for the sake of brevity. Next, the line-pattern detecting module 120 can compare whether the generated flags match one of a plurality of predetermined combinations to determine which pattern the image area corresponds to.

For example, if the flags generated from the operations for the first and the second plurality of pixels respectively match to "none, none, none, none, none, none, none, none, none, none" and "none, none, none, none, none, none, none, none, none, none", then the image area can be determined corresponding to a "smooth pattern"; if the flags generated from the operations for the first and the second plurality of pixels respectively match to "positive, negative, positive, negative, positive, negative, positive, negative, positive, negative" and "positive, negative, positive, negative, positive, negative, positive, negative, positive, negative", then the image area can be determined corresponding to a "mess pattern"; if the flags generated from the operations for the first and the second plurality of pixels respectively match to "none, none, none, none, positive, negative, none, none, none, none" and "none, none, none, none, positive, negative, none, none, none, none", then the image area can be determined corresponding to a "vertical edge pattern"; if the flags generated from the operations for the first and the second plurality of pixels respectively match to "none, none, none, none, none, none, positive, negative, none, none" and "none, none, none, none, none, none, none, positive, negative, none, none", then the image area can be determined corresponding to a "right tilted edge pattern". Of course, these are four simple examples, and a designer can also decide other predetermined patterns (such as a low angle edge pattern, a high angle edge pattern, a tip pattern, an object boundary pattern, or line crossing pattern, etc.) that the line-pattern detecting module 120 is able to determine according to operation requirements of the image processing module 140, and these are not limitations of the present invention.

Figure 11:
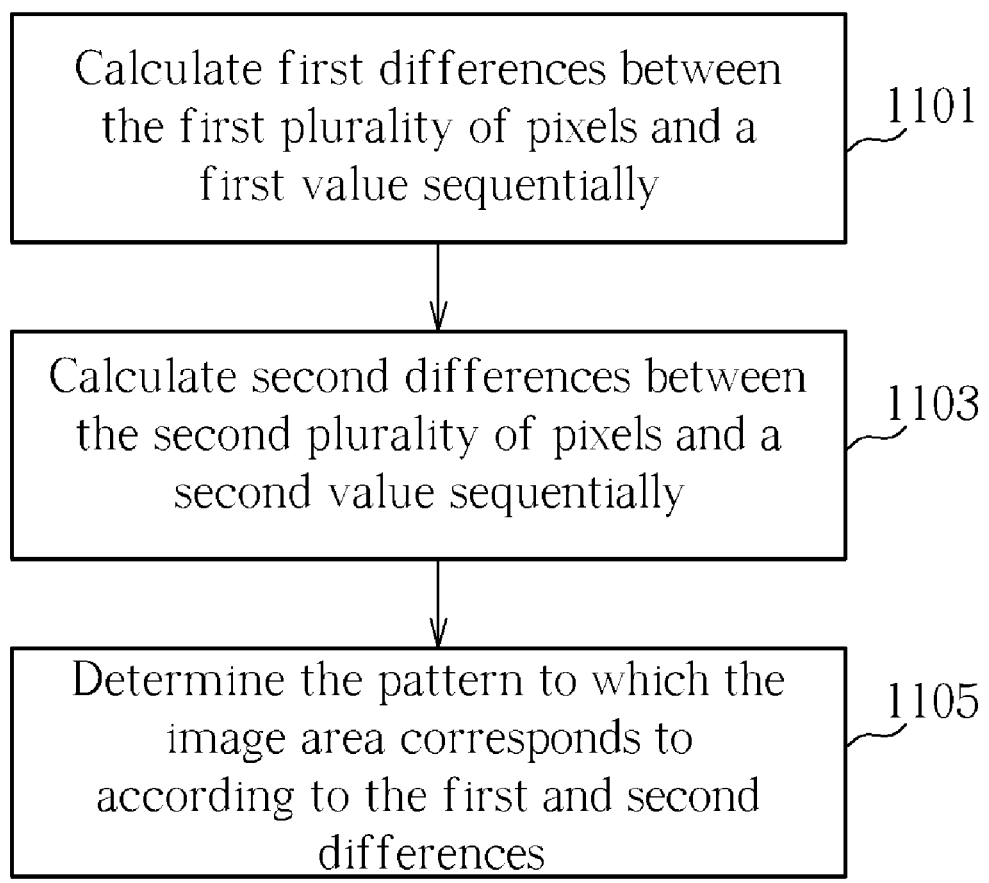
FIG. 11 is a flow chart illustrating a pattern detecting method according to an embodiment of the present application.

Above mentioned steps can be summarized as FIG. 11. FIG. 11 is a flow chart illustrating a pattern detecting method according to an embodiment of the present application. The pattern detecting method in FIG. 11 includes:

Step 1101: Calculate first differences between the first plurality of pixels and a first value sequentially.

Step 1103: Calculate second differences between the first plurality of pixels and a second value sequentially.

Step 1105: Determine the pattern to which the image area corresponds to according to the first and second differences (i.e. generate the flag according to the first and second differences, and compare the first and second differences with predetermined combinations).

Figure 2:
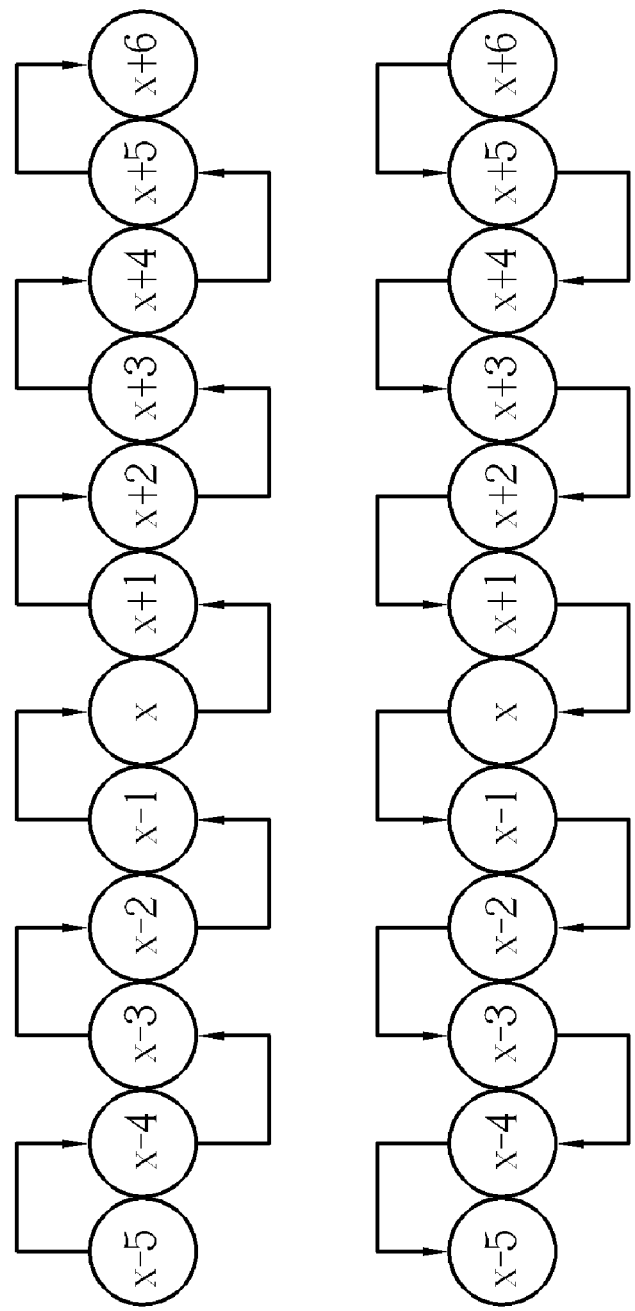
FIG. 2 is a schematic diagram illustrating how to calculate pixel differences.
Figure 3:
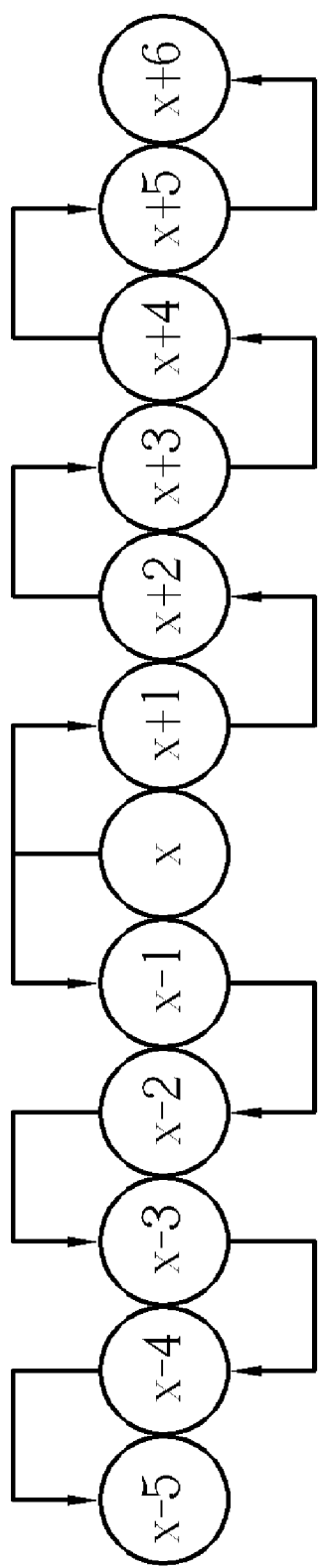
FIG. 3 is another schematic diagram illustrating how to calculate pixel differences.
Figure 4:
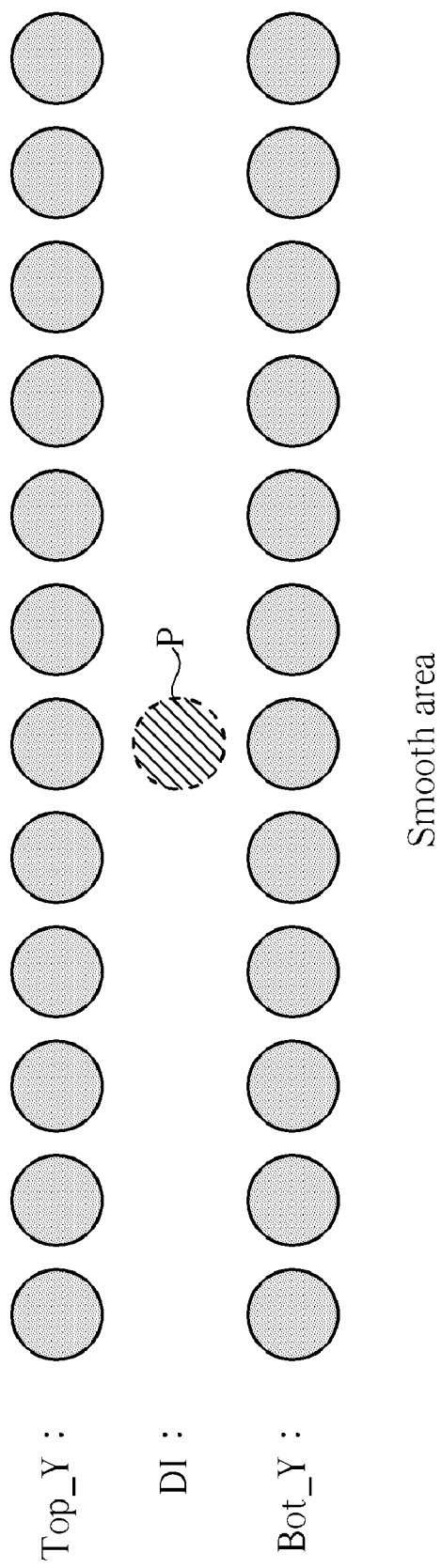
FIG. 4 is a schematic diagram illustrating a smooth area pattern.
Figure 5:
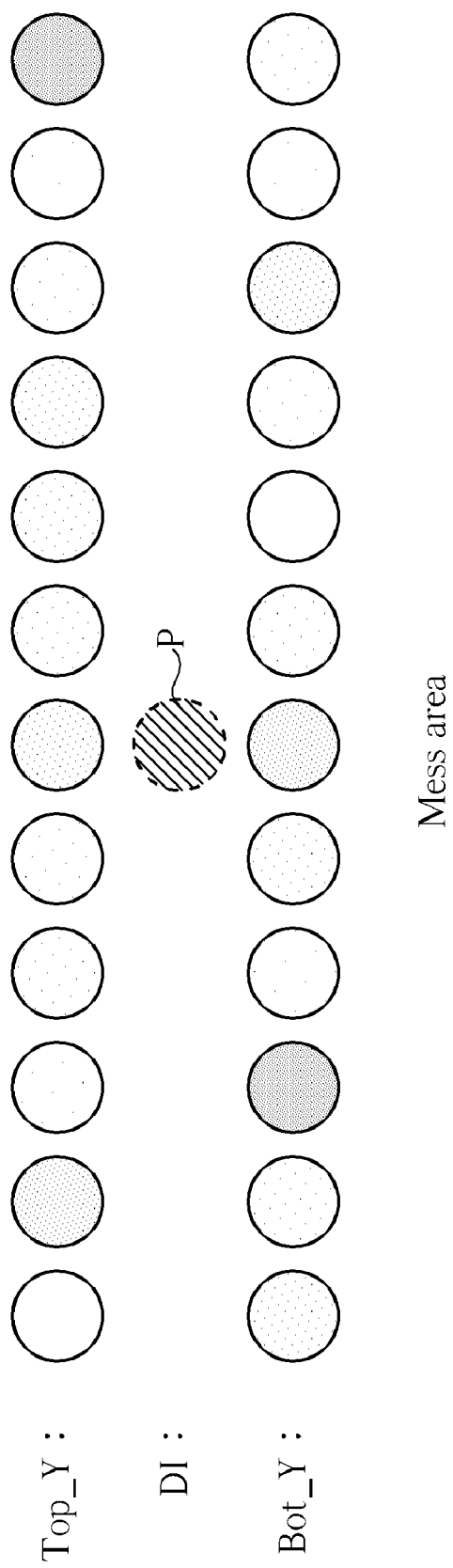
FIG. 5 is a schematic diagram illustrating a mess area pattern.
Figure 6:
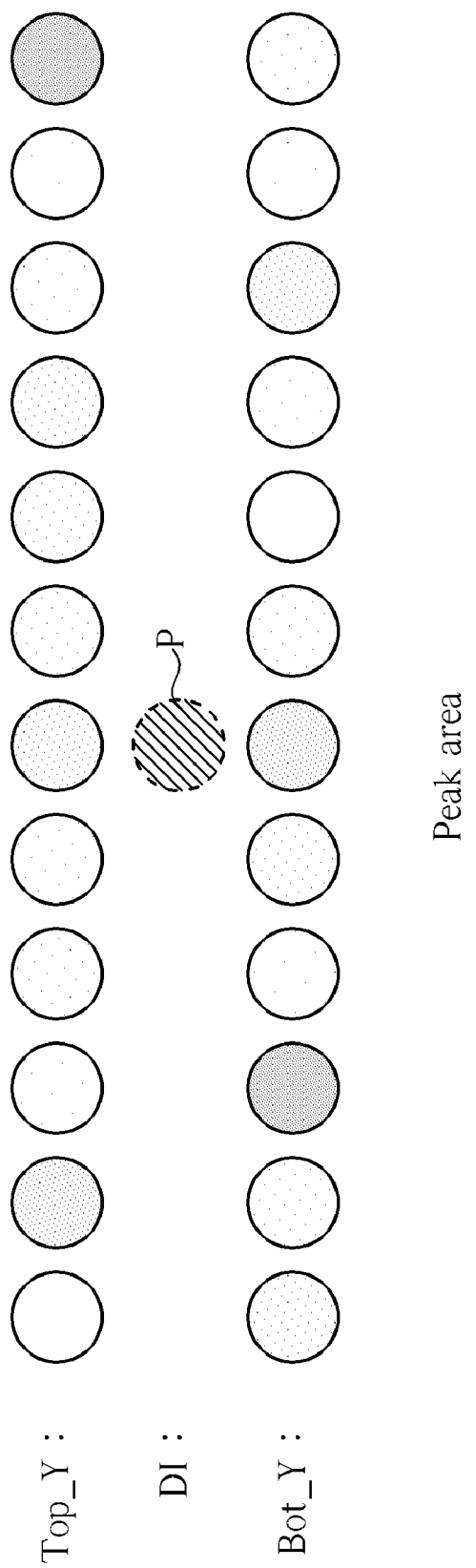
FIG. 6 is a schematic diagram illustrating a peak area pattern.
Figure 7:
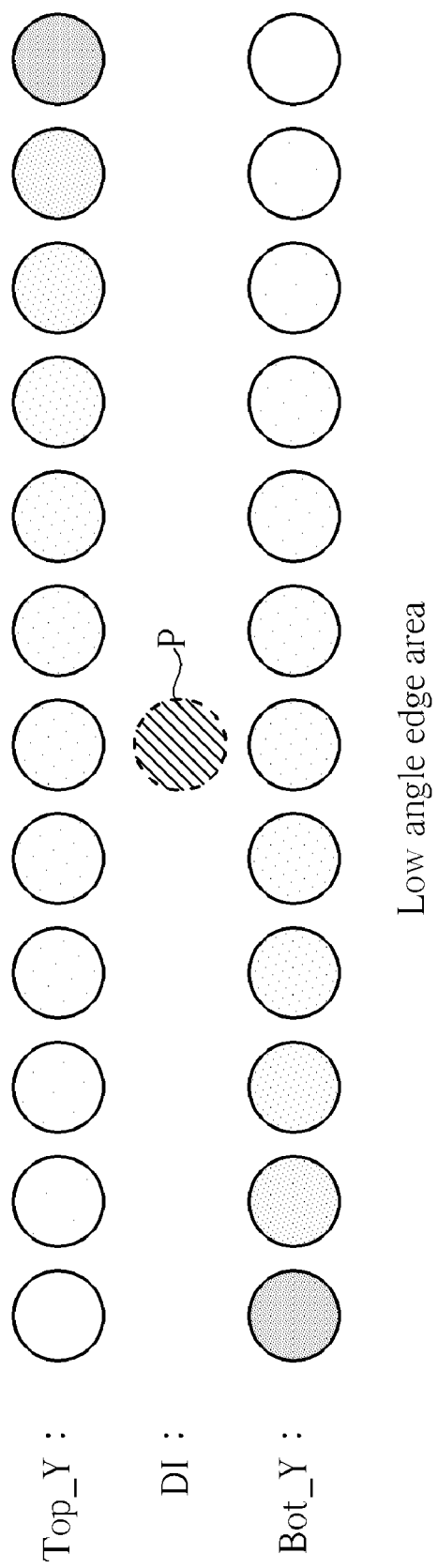
FIG. 7 is a schematic diagram illustrating a low angle edge area pattern.
Figure 8:
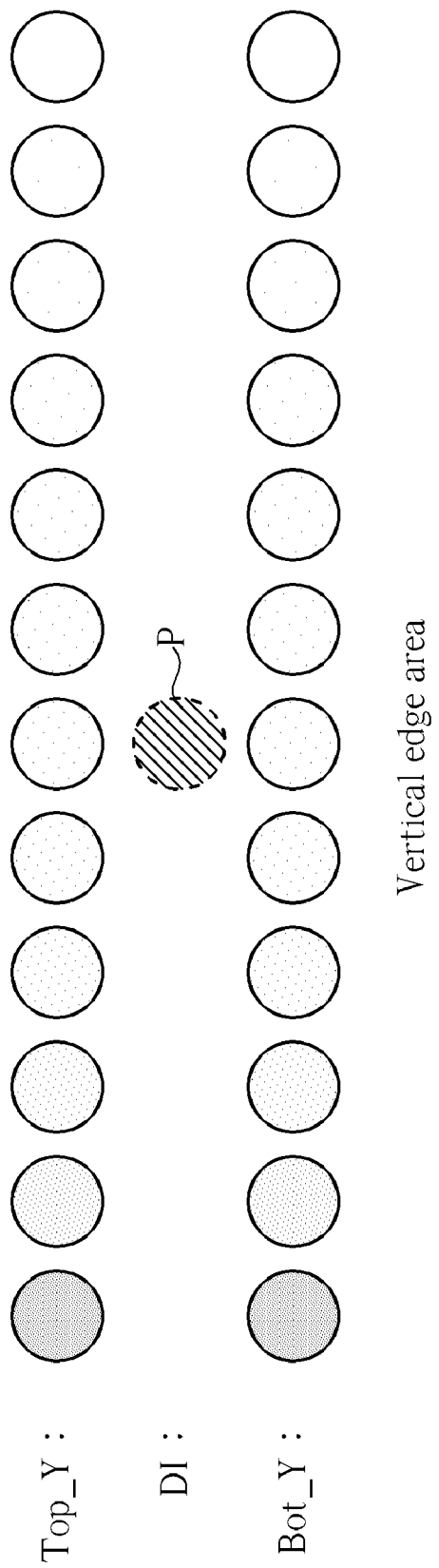
FIG. 8 is a schematic diagram illustrating a vertical edge area pattern.
Figure 9:
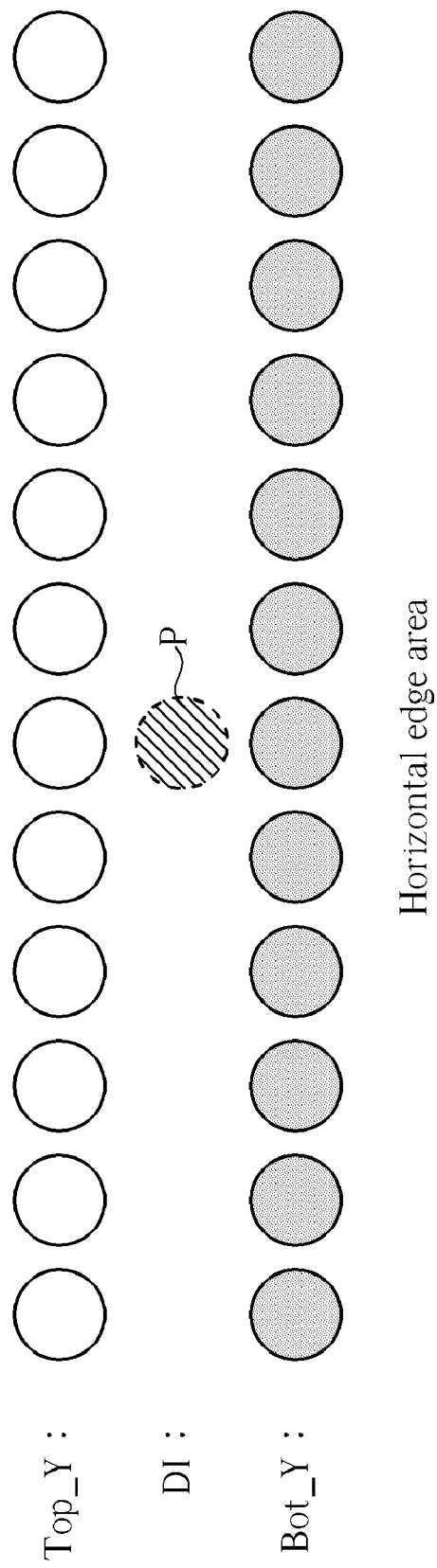
FIG. 9 is a schematic diagram illustrating a horizontal edge area pattern.
Figure 10:
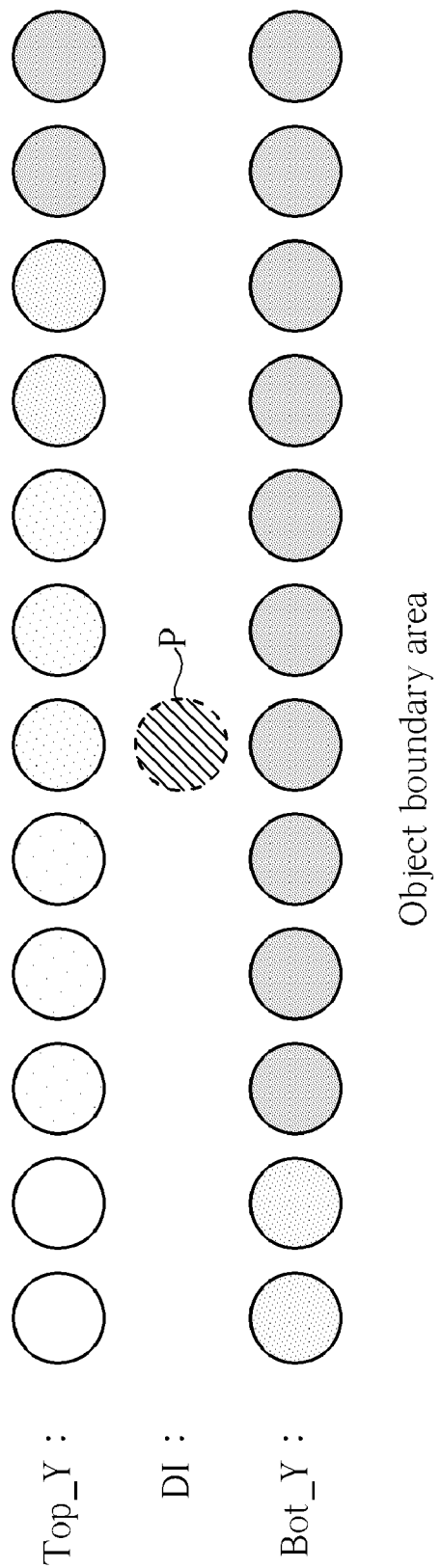
FIG. 10 is a schematic diagram illustrating a object boundary area pattern.

Please refer to FIG. 2 and FIG. 3. In the examples mentioned above, the "pixel operation in sequence" is an operation in sequence from X−5 to X+5, and of course "pixel operation in sequence" can also be an operation in sequence from X+5 to X−5, or an operation in sequence from X to X−5 and from X to X+5. Furthermore, when executing a subtraction operation, it is also practicable to utilize a variable value as a criterion value on the right side of the minus sign in the subtraction operation, and then utilize the first (or the second) plurality of pixels as the value on the left side of the minus sign in the subtraction operation in sequence, and the variable value can be adjusted properly according to the execution of the subtraction operation. Of course, it is also practicable to utilize a constant value as a criterion value on the right side of the minus sign in the subtraction operation, and then utilize the first (or the second) plurality of pixels as the value on the left side of the minus sign in the subtraction operation in sequence. Please note that the "pixel operation in sequence" executed by the line-pattern detecting module 120 for the first and the second plurality of pixels can be achieved by various schemes. The examples mentioned above are given as practicable schemes, and not as limitations of the present invention.

Of course, there are many kinds of pattern determining methods, and it is not necessary to set the flags first and then examine whether the flags match the predetermined combinations to determine which pattern the image area corresponds to, as mentioned above. As long as it is first examined how the first and the second plurality of pixels change, and then determined which pattern the image area corresponds to according to the examining results, this method falls in the scope of the present invention. For example, if the first and the second plurality of pixels are seen to change in a disorderly fashion, then the line-pattern detecting module 120 can determine that the image area corresponds to a "mess pattern"; if the first and the second plurality of pixels are seen to be similar to each other, then the line-pattern detecting module 120 can determine that the image area corresponds to a "smooth pattern"; if the first plurality of pixels are all seen to be similar to a first value and the second plurality of pixels are all seen to be similar to a second value, then the line-pattern detecting module 120 can determine that the image area corresponds to a "horizontal edge pattern". Of course, a designer can also decide other predetermined patterns that the line-pattern detecting module 120 is able to determine according to operation requirements of the image processing module 140, and these are not limitations of the present invention.

FIGS. 4-10 are schematic diagrams illustrating the pixel value distribution of different patterns. The pixel P indicates the pixel to be interpolated. Also, the pixel line Top_Y and the pixel line Bot_Y can be an existing pixel line or an interpolated pixel line of the image.

Please note that although two horizontal pixel lines are utilized as the basis of the pattern detection in the above embodiment, a person familiar with image processing techniques can utilize the concept and scheme of the embodiment in the present invention to select a required number of pixel lines in the pattern detection. The pixel line is not limited to be along the horizontal direction, and it can also be along the vertical direction or other different directions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pattern detecting method for determining a pattern to which an area in an image corresponds, the pattern detecting method comprising:
    examining how a first plurality of pixels of a first pixel line in the image change;
    examining how a second plurality of pixels of a second pixel line in the image change;
    generating at least one flag set indicating the changing of the first plurality of pixels and the second plurality of pixels, wherein the flag set includes a plurality of flags, generating at least one flag set comprising the steps of:
        calculating first differences between the first plurality of pixels and a first constant value sequentially;
        calculating second differences between the second plurality of pixels and a second constant value sequentially; and
        generating the flag set according to the first and second differences;
    comparing the flag set with predetermined combinations corresponding to more than two candidate patterns to generate a comparing result; and
    determining the pattern to which the image area corresponds to according to the comparing result, where the pattern is one of the candidate patterns;
    wherein the first pixel line and the second pixel line correspond to the image area.

2. The pattern detecting method of claim 1, wherein the steps of examining how the first and the second plurality of pixels change respectively comprise:
    performing a pixel operation in sequence for the first plurality of pixels; and
    performing the pixel operation in sequence for the second plurality of pixels.

3. The pattern detecting method of claim 1, wherein the steps of examining how the first and the second plurality of pixels change respectively comprise:
    calculating differences between each pair of adjacent pixels in the first plurality of pixels in sequence; and
    calculating differences between each pair of adjacent pixels in the second plurality of pixels in sequence.

4. The pattern detecting method of claim 1, wherein at least one of the first constant value and the second constant value is adjustable.

5. The pattern detecting method of claim 1, wherein the image area comprises a target pixel, the first pixel line is a first horizontal pixel line above the target pixel, and the second pixel line is a second horizontal pixel line below the target pixel.

6. The pattern detecting method of claim 5, wherein the target pixel is a required interpolated pixel of the image.

7. The pattern detecting method of claim 5, wherein the first horizontal pixel line is an existing pixel line or an interpolated pixel line of the image, and the second horizontal pixel line is an existing pixel line or an interpolated pixel line of the image.

8. An image processing apparatus for processing an image, the image processing apparatus comprising:
    a line-pattern detecting module, for examining how a first plurality of pixels of a first pixel line change and how a second plurality of pixels of a second pixel line change so as to generate at least one flag set indicating the changing of the first plurality of pixels and the second plurality of pixels, for comparing the flag set with predetermined combinations corresponding to more than two candidate patterns to generate a comparing result; and for determining a pattern to which an area of the image corresponds according to the comparing result, where the pattern is one of the candidate patterns, wherein the first pixel line and the second pixel line correspond to the image area, where the flag set includes a plurality of flags, wherein the line-pattern detecting module calculates differences between the first plurality of pixels and a first constant value sequentially to examine how the first plurality of pixels change, and the line-pattern detecting module calculates differences between the second plurality of pixels and a second constant value sequentially to generate the flag set according to the differences; and
    an image processing module, coupled to the line-pattern detecting module, for selectively performing at least one of a plurality of image processing operations according to the pattern to which the image area corresponds.

9. The image processing apparatus of claim 8, wherein the line-pattern detecting module performs a pixel operation in sequence for the first plurality of pixels to examine how the first plurality of pixels change and performs the pixel operation in sequence for the second plurality of pixels to examine how the second plurality of pixels change.

10. The image processing apparatus of claim 8, wherein the line-pattern detecting module calculates differences between each pair of adjacent pixels in the first plurality of pixels sequentially to examine how the first plurality of pixels change, and calculates differences between each pair of adjacent pixels in the second plurality of pixels sequentially to examine how the second plurality of pixels change.

11. The image processing apparatus of claim 8, wherein at least one of the first constant value and the second constant value is adjustable.

12. The image processing apparatus of claim 8, wherein the image area comprises a target pixel, the first pixel line is a first horizontal pixel line above the target pixel, and the second pixel line is a second horizontal pixel line below the target pixel.

13. The image processing apparatus of claim 5, wherein the target pixel is a required interpolated pixel of the image, and both the first and the second horizontal pixel line are existing pixel lines or interpolated pixel lines of the image, and the image processing module generates the target pixel according to the pattern corresponding to the image area determined by the line-pattern detecting module.

14. The image processing apparatus of claim 8, wherein the image processing operations comprise determining interpolation searching range, determining interpolation searching angle, and selecting intra-field interpolation or inter-field interpolation.

15. The pattern detecting method of claim 1, wherein the candidate patterns comprise at least three of: a smooth pattern, a mess pattern, a peak pattern, a low angle edge pattern, a vertical edge pattern, a horizontal edge pattern, and an object boundary pattern.

16. The image processing apparatus of claim 8, wherein the candidate patterns comprise at least three of: a smooth pattern, a mess pattern, a peak pattern, a low angle edge pattern, a vertical edge pattern, a horizontal edge pattern, and an object boundary pattern.

* * * * *